Nov. 6, 1934.        J. FERGUSON         1,979,609
APPARATUS FOR MAKING AND REFINING GLASS
Filed Aug. 6, 1932
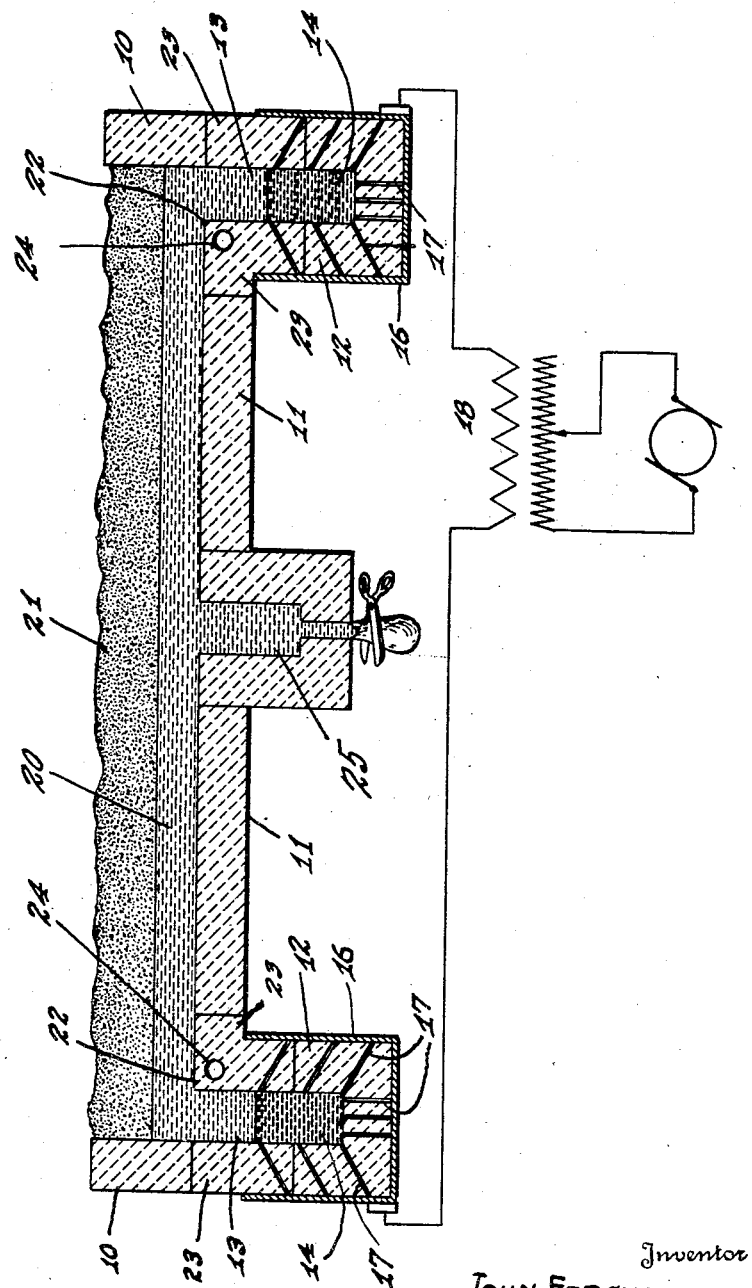
Inventor
JOHN FERGUSON, Patented Nov. 6, 1934

1,979,609

UNITED STATES PATENT OFFICE 1,979,609

APPARATUS FOR MAKING AND REFINING GLASS

John Ferguson, Indianapolis, Ind.

Application August 6, 1932, Serial No. 627,706

8 Claims. (Cl. 13—6)

My invention is concerned with the manufacture and refinement of glass by a process and apparatus involving the generation of heat by means of an electric current passed through molten glass.

Among the objects of my invention are to reduce the size of the apparatus necessary for the production of glass at a given rate, to increase the efficiency of the glass making and refining operations, to utilize advantageously heat escaping from the body of the molten glass, to generate the highest temperature in the body of the molten glass near the bottom thereof where high temperature is most effective in promoting convection currents in the glass, to provide an electrode which will not have a deleterious effect on the glass with which it is in contact, and to provide a simple and effective method for initiating operation of the glass furnace.

In carrying out my invention I employ a furnace having a lining of refractory material, preferably formed as hereinafter set forth, and I provide at each end of this furnace suitable electrodes which are located at or below the bottom of the furnace. Conveniently, each electrode is located in a well of refractory material surrounded by a metallic casing or jacket, the electrodes being of a metal, preferably lead, which will be molten when the furnace is in operation and the refractory forming each well being of such a nature as to permit the molten metal constituting the electrodes to seep through it into contact with the associated well-jacket which serves as an electrode terminal. The top of the furnace is open, and the molten glass therein is covered with a blanket or layer of unmelted glass ingredients which forms the roof of the furnace. These ingredients feed downwardly to be melted and incorporated in the molten glass below them, such molten glass being drawn off through a suitable opening in the bottom of the furnace. As the layer of unmelted ingredients melts down it is replenished by the addition from above of fresh batch material.

The single figure of the drawing constitutes a vertical longitudinal section through a glass furnace embodying my invention.

The furnace illustrated in the drawing comprises walls 10 and a bottom 11 of suitable refractory material. Near each end of the furnace the refractory material extends downwardly to form a projection 12 the interior of which is hollow providing a well 13 which communicates with the interior of the furnace. The electrodes 14 employed are located in the wells 13 and are preferably formed of lead which, when the furnace is in operation, is molten.

Each of the projections 12 is surrounded by a jacket 16 of some suitable metal, preferably a heat-resisting steel or steel-alloy. The refractory forming each of the downwardly extending projections 12, if it does not inherently contain capillary fissures or channels extending through it, is provided with passages 17 of small cross-sectional area which afford paths through which the molten metal of the electrode 14 can seep into contact with the jacket 16.

Current for the operation of the furnace is supplied through the jackets 16, which are shown in the drawing as connected across the secondary of a variable-voltage step-down transformer 18. The molten metal of each electrode 14, extending through the fissures or channels 17, forms a path for the current between the jacket 16 and the body of the electrode 14.

As previously indicated, the metal which I prefer to employ as the electrodes 14 is lead. This metal has a comparatively low melting point and, at furnace temperatures, is far less viscous than is the molten glass. As a result of this low viscosity, it can penetrate the small channels 17, whereas the molten glass can not do so.

I prefer to employ lead as an electrode, for I have found as the result of numerous experiments that it is probably the most satisfactory metal for the purpose. It is not affected in any material respect by the ingredients commonly employed in glass, and it therefore has no tendency to discolor the glass. If it has any effect at all upon the glass, it is one of increasing the clarity and brilliance thereof.

In mentioning lead as a suitable electrode, I of course do not wish to be understood as limiting my invention to the use of absolutely pure lead; for lead, even in the presence of other metals, possesses the desirable properties above mentioned.

In the operation of the furnace, the molten glass 20 therein covers the bottom of the furnace and extends downwardly into the wells 13 into contact with the electrodes 14. The current passing through the molten glass between the electrodes 14 generates heat, owing to the high resistance of the molten glass, and maintains the glass at an elevated temperature.

I have found it of the utmost value to maintain upon the upper surface of the molten glass 20 a relatively thick layer 21 of the unmelted ingredients which are embodied in the glass, to the extent that the thick layer constitutes the transient roof of the furnace. These ingredients, as the result of their close association with the molten glass, are preheated both by radiation from the body of the molten glass and by heat liberated from the gases which escape from the molten glass and pass upwardly through the layer of unmelted ingredients.

As the result of the so called "Nernst effect", the current density in a liquid body of high resistance, such as the molten glass 20, is greatest in the line constituting the shortest path for electric current passing between the electrodes. Because the electrodes 14 are located below rather than above the bottom of the furnace, the shortest path for an electric current flowing between them will be along the bottom of the furnace. This greater current-density adjacent the bottom of the furnace causes the highest temperature in the body of the molten glass 20 to exist adjacent the bottom. Because the highest temperature within the body of the molten glass is at the bottom, convection currents are set up which effect a rapid escape from the molten glass of gas bubbles (seed) included in the body of the molten glass, aid in thoroughly mixing the glass, and are generally beneficial in the production and refinement of glass of a uniform quality at a high rate of speed.

For glass of any given composition, there is a certain optimum maximum temperature to which the glass should be subjected in the process of manufacture, such temperature usually being in the neighborhood of 2,400° to 2,500° F. I maintain this optimum temperature in my process by properly balancing two controlling factors—i. e. the rate of supply of ingredients and discharge of refined glass on the one hand and the rate of supply of electrical energy on the other hand. Thus, an increase in the rate of energy supplied must be accompanied by an increase in the rate at which batch materials are supplied and finished glass produced, to the end that the electric energy released as heat may be absorbed by the batch material in melting in order that the temperature of the refined glass may not be increased but kept uniform.

I contemplate that glass will be withdrawn from the furnace through the bottom thereof and from a point adjacent the bottom where, as above set forth, the highest temperatures exist. To this end I provide in the floor of the furnace a discharge opening 25 through which molten glass flows downwardly under hydrostatic pressure. The pressure effective to cause discharge of molten glass through the orifice 25 depends upon the height of the molten glass and unmelted glass ingredients in the furnace, and the rate of glass-discharge can therefore be satisfactorily controlled by suitable regulation of the amount of unmelted glass ingredients supplied to the furnace, which, as previously indicated, must be properly co-ordinated with the rate of energy-supply to maintain the desired temperature.

I have found that in a furnace of the type described the greatest tendency of the refractory to erode occurs at and near the place where the glass is in contact with the electrodes 14 and also adjacent the corners 22 between the interior of the furnace and the wells 13. I find it desirable to form the furnace-lining at these points of blocks 23 of fused zirconium oxide. I may form the blocks 23, whether of fused zirconium oxide or of other refractory material, with passages 24 adjacent the corners 22 to permit the flow through the blocks of some cooling fluid such as air.

Various means may be employed for initiating operation of the furnace. For example, glass melted outside the furnace may be poured thereinto to a depth sufficient to provide a path for electric current between the electrodes 14. Current supplied to the electrodes 14 thereafter will maintain the body of molten glass at elevated temperature and will gradually melt the glass ingredients 21 spread upon the surface. Another method which may be employed is to place in the furnace unmelted glass ingredients in quantities sufficient to fill the wells 13 and to cover the furnace-bottom and to melt these ingredients in place by gas or oil flame.

While either of the two methods just mentioned for initiating operation of the furnace may be employed, I prefer a third method which does not require the use of any exterior heat-source. In this method, I cover the floor of the furnace with a layer of powdered or granular carbon or some similar material of relatively high resistance and employ it to form a high-resistance path between the electrodes 14. Solid glass or glass ingredients are then placed in the furnace, and current is supplied. The layer of carbon or equivalent material serves as a resistor element and generates sufficient heat to melt the glass ingredients, and thereafter the molten glass forms the resistor element. The powdered carbon or other material employed is washed out of the furnace with the glass first withdrawn therefrom, and has no subsequent effect.

While I have illustrated my furnace as provided with but two electrodes and therefore adapted for use with direct current and single-phase alternating current, my invention is equally adapted to the use of multiple-phase alternating currents. If multiple-phase currents are used, it is obvious that the furnace should be constructed to provide a symmetrical disposition of the electrodes in order to secure even distribution of temperatures in the body of the molten glass.

The chief advantage of my process and apparatus for the production of glass is the extremely short length of time which elapses between the introduction of batch material into the furnace and the discharge of that batch material as finished refined glass. In tank furnaces of the type now used in high-quantity commercial production of glass, the capacity of the tank is in the neighborhood of four times the daily output from the tank, so that approximately four days elapse between the introduction of batch material and the discharge of glass which that material forms. In my apparatus and process, on the other hand, the daily output of the furnace may be as great as one hundred times the volume of molten glass the furnace contains, batch materials being pre-heated, melted, refined, and discharged within a space of fifteen minutes or even less.

I claim as my invention:—

1. In an electric glass-melting furnace in which molten glass is the resistor element, an electrode comprised of lead, an electrode-container of refractory material, and a metallic casing surrounding said container, said container having one or more passages of relatively small cross-sectional area extending through its wall through which the lead of said electrode may extend into electrical contact with said casing.

2. In an electric glass-melting furnace in which molten glass is the resistor element, an electrode comprised of molten metal, an electrode-container of refractory material, and a metallic casing surrounding said container, said container having one or more passages of relatively small cross-sectional area extending through its wall through which the molten metal of said electrode may extend into electrical contact with said casing.

3. In an electric glass-melting furnace in which molten glass is the resistor element, a pair of spaced electrodes disposed at least as low as the floor of said furnace, whereby the shortest path for electric current between said electrodes will be adjacent the furnace floor, the floor of the furnace being provided with an opening through which glass can be withdrawn downwardly.

4. In an electric glass-melting furnace in which molten glass is the resistor element, a plurality of spaced electrodes composed of lead, an electrode-container of refractory material for each electrode, and a metallic casing surrounding each of said containers.

5. In an electric glass-melting furnace in which molten glass is the resistor element, a plurality of spaced electrodes composed of lead, an electrode-container of refractory material for each electrode, and a steel casing surrounding each of said containers.

6. In an electric glass-melting furnace in which molten glass is the resistor element, a plurality of spaced electrodes composed of molten metal, an electrode-container of refractory material for each electrode, and a metallic casing surrounding each of said containers.

7. In an electric glass-melting furnace in which molten glass is the resistor element, a plurality of spaced electrodes disposed at least as low as the floor of said furnace, whereby the shortest path for electric current between said electrodes will be adjacent said floor, and a well depending from the furnace floor having a discharge opening in the bottom thereof for removing molten glass therethrough from a point in the furnace adjacent said path.

8. In an electric glass-making furnace in which molten glass is the resistor element, a plurality of spaced electrodes, a well formed in the furnace and depending below the floor thereof for containing said electrodes, whereby the shortest path for the electric current between said electrodes will be adjacent the furnace floor, and a feeding well depending from the floor of the furnace intermediate said electrodes provided with a glass discharge opening in the bottom thereof through which molten glass from adjacent said path may be fed from the furnace.

JOHN FERGUSON.